United States Patent
Gillespie et al.

[11] Patent Number: 5,992,884
[45] Date of Patent: Nov. 30, 1999

[54] RESTRAINING BELT SYSTEM FOR SECURING A DETAINEE

[75] Inventors: Donald Chris Gillespie, Troutdale; Richard B. Austria, Keizer; John Scott Montgomery, Portland; Scott M. Reasor, Gresham; Sam J. Pronesti, Portland, all of Oreg.

[73] Assignee: The City of Portland, Oregon, Portland, Oreg.

[21] Appl. No.: 08/735,501

[22] Filed: Oct. 23, 1996

[51] Int. Cl.$^6$ .................................................. B60R 22/00
[52] U.S. Cl. ........................... 280/808; 297/481; 297/483
[58] Field of Search .............................. 280/801.1, 808; 297/481, 483, 468

[56] References Cited

U.S. PATENT DOCUMENTS

| | | | |
|---|---|---|---|
| 3,219,361 | 11/1965 | Brown | 280/801.1 |
| 3,637,259 | 1/1972 | Rothschild . | |
| 3,963,273 | 6/1976 | Nagazumi . | |
| 4,004,583 | 1/1977 | Johnson . | |
| 4,139,215 | 2/1979 | Guitard et al. . | |
| 4,179,136 | 12/1979 | Matsuoka | 280/808 |
| 4,216,978 | 8/1980 | Mauron . | |
| 4,256,329 | 3/1981 | Winnale . | |
| 4,272,104 | 6/1981 | Cuny | 280/801.1 |
| 4,284,295 | 8/1981 | Takeda et al. . | |
| 4,726,605 | 2/1988 | Carter | 280/801.1 |
| 4,733,886 | 3/1988 | Yokote | 280/801.1 |
| 4,789,183 | 12/1988 | Wolfer . | |
| 4,944,557 | 7/1990 | Tsubai . | |
| 4,995,672 | 2/1991 | Corcoran . | |
| 5,022,677 | 6/1991 | Barbiero | 280/801.1 |

*Primary Examiner*—Peter C. English
*Attorney, Agent, or Firm*—Kolisch, Hartwell, Dickson, McCormack & Heuser

[57] ABSTRACT

The present invention is a restraining system for securing a detainee in a seat of a vehicle including a restraining belt extending from an anchoring point in the middle region of the seat to a stowing point outboard of the anchoring point and a latching mechanism adjacent to a side region of the seat. The system is in non-securing operation when the belt extends to the stowing point and in securing operation when the belt is removed from the stowing point and connected to the latching mechanism such that the belt traverses the detainee's torso.

12 Claims, 3 Drawing Sheets

RESTRAINING BELT SYSTEM FOR SECURING A DETAINEE

BACKGROUND OF THE INVENTION

The invention relates generally to seat belt systems. More particularly, it concerns a restraining belt system for securing a detainee in a seat of a vehicle.

Most police officers use some form of seat belt restraint for prisoners. This use serves two principal functions: further immobilization of the handcuffed detainee, and protection for the detainee from impact with the interior of the vehicle in the course of rough or abrupt vehicle movement. Conventional seat belt systems in police vehicles are similar to seat belt systems in passenger vehicles in that the shoulder and/or lap belt originate adjacent the doors of the vehicle, while the buckles are remote from the door. Thus, in attempting to belt in a detainee, an officer must grasp the belt and reach across and in front of the detainee's body, putting the officer in a vulnerable position while the officer attempts to both latch the safety belt and cinch it tight. Because many detainees violently resist every step of the arrest process, they are likely to attempt to bite or head-butt the exposed and otherwise occupied officer. As a result, officers face serious injury in the discharge of their duties. Likewise, if an officer chooses not to secure a particularly violent detainee because of the aforementioned problems, the detainee faces potential serious injury because the handcuffs prevent any self-protection in the event of a sudden stop. As a result of this, the police department faces potential liability.

Various techniques have developed with respect to restraining prisoners. For example, U.S. Pat. No. 4,995,672 describes a contoured seat back and cinching belt restraint system for forcing the prisoner into the seat's recessed channels. However, the buckle is remote from the door and requires the vulnerable maneuver previously discussed. U.S. Pat. No. 4,004,583 teaches a restraining device that uses a VELCRO type hook-and-loop fastener for securing a prisoner to a seat. Again, however, the fastening portion of the loop is remote from the door. Other prior art approaches to latching a seat belt system would not be appropriate for securing a detainee. For example, automatic-closure seat belt systems would be dangerous and impracticable for a physically resistant prisoner. U.S. Pat. No. 3,637,259 describes such a system, where a curved semi-rigid restraining member pivots around a passenger and latches automatically, providing an opportunity for a detainee to block operation of the system by placing the detainee's body in the path of the semi-rigid restraining member.

Like the automatic-closure seat belt systems, a three-point seat belt system also presents difficulties in securing a detainee. U.S. Pat. No. 4,284,295 teaches a three-point seat belt system, where two connecting points of the seat belt are permanently fixed to the rear portion of a vehicle door (relative to the front of the vehicle) and one connecting point is remote from the door and adjacent to the seat, for passive latching when the door is in the closed position. Similarly, U.S. Pat. No. 4,256,329 discloses a three-point system with the same two rearward connecting points on a vehicle door, with the additional feature that the seat belt can be detached from the lower of the two points and reattached to a buckle adjacent to the seat and the door, for tighter securing of a child. However, both references presume a non-resistant passenger. The web-like surface created by a three-point system would be potentially entangling to a resistant detainee being forced into a vehicle by an officer, creating a dangerous situation for the detainee and the officer alike.

Therefore, it is an object of the present invention to overcome the drawbacks and limitations with existing seat belt systems. More specifically, the present invention has the following objects:

1) to provide a restraint system which allows an officer to secure a detainee in a seat of a vehicle without placing the officer's body in a vulnerable position relative to the detainee;

2) to develop a seat belt system which can secure a detainee in a seat of a vehicle to prevent unrestricted movement or escape by the detainee;

3) the provision of a system for securing a detainee in a seat of a vehicle to protect the detainee from sliding laterally or falling forwardly when the vehicle is cornering or stopping and the detainee's arms are locked in handcuffs behind the detainee's back;

4) to provide a restraint system which safely holds a detainee in a seat of a vehicle in the event of an automobile accident;

5) the development of a system for providing access to the restraining belt system at a position substantially forward and remote from a detainee; and 6) to provide a durable, inexpensive system for securing a detainee in a seat of a vehicle, the system being easily retrofitted to existing police vehicles.

SUMMARY OF THE INVENTION

The present invention is a restraining belt system for securing a detainee in a seat of a vehicle including a restraining belt extending from an anchoring point in the middle region of the seat to a stowing point outboard of the anchoring point and a latching mechanism adjacent to a side region of the seat. The system is in non-securing operation when the belt extends to the stowing point and in securing operation when the belt is removed from the stowing point and connected to the latching mechanism such that the belt traverses the detainee's torso.

These and other objects and advantages of the invention will be more clearly understood from a consideration of the accompanying drawings and the following description of the preferred embodiment.

DETAILED DESCRIPTION OF THE PREFERRED EMBODIMENT

Figure 1:
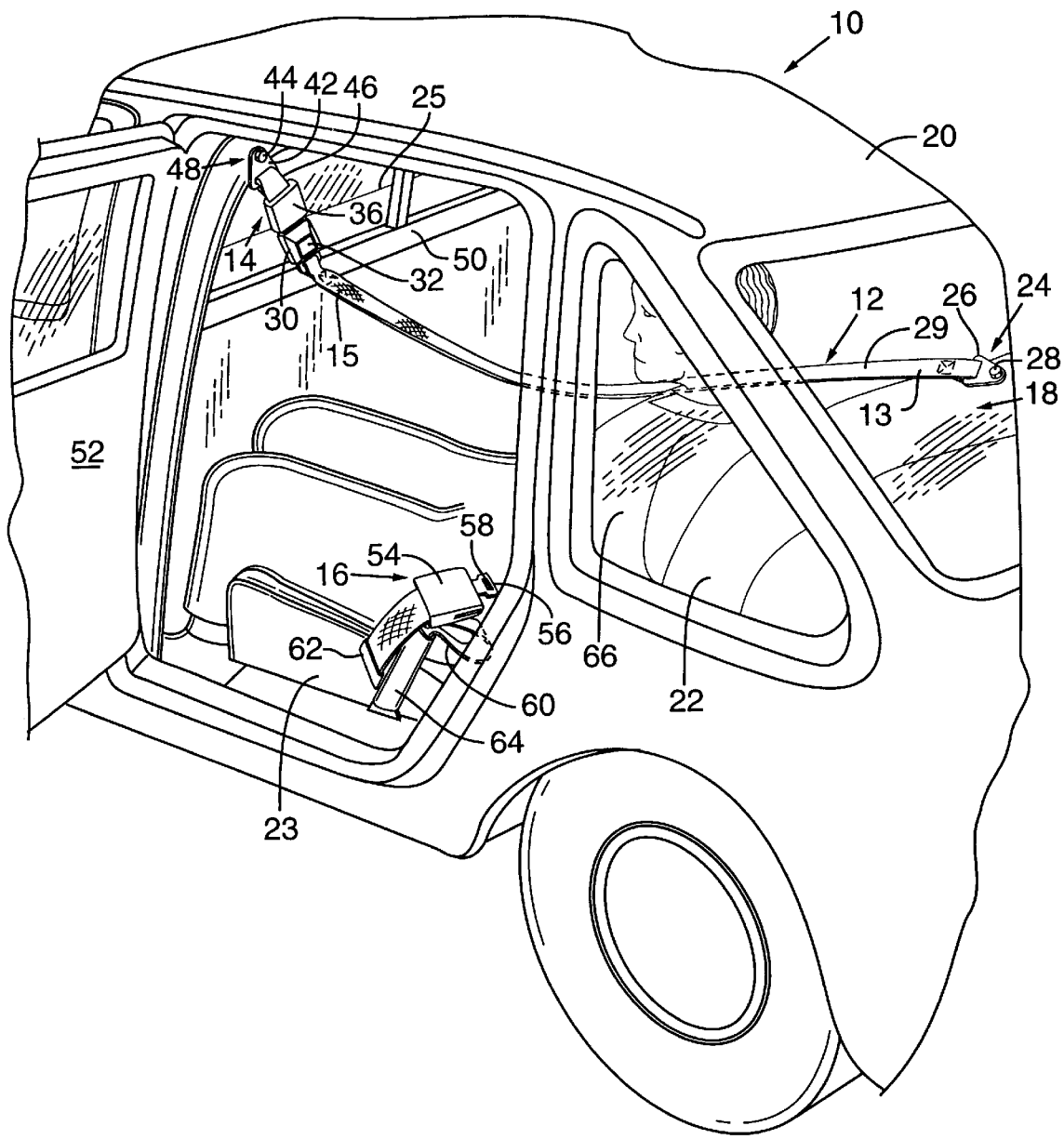
FIG. 1 is a side view of a police vehicle utilizing the present invention in non-securing, stowed mode.
Figure 2:
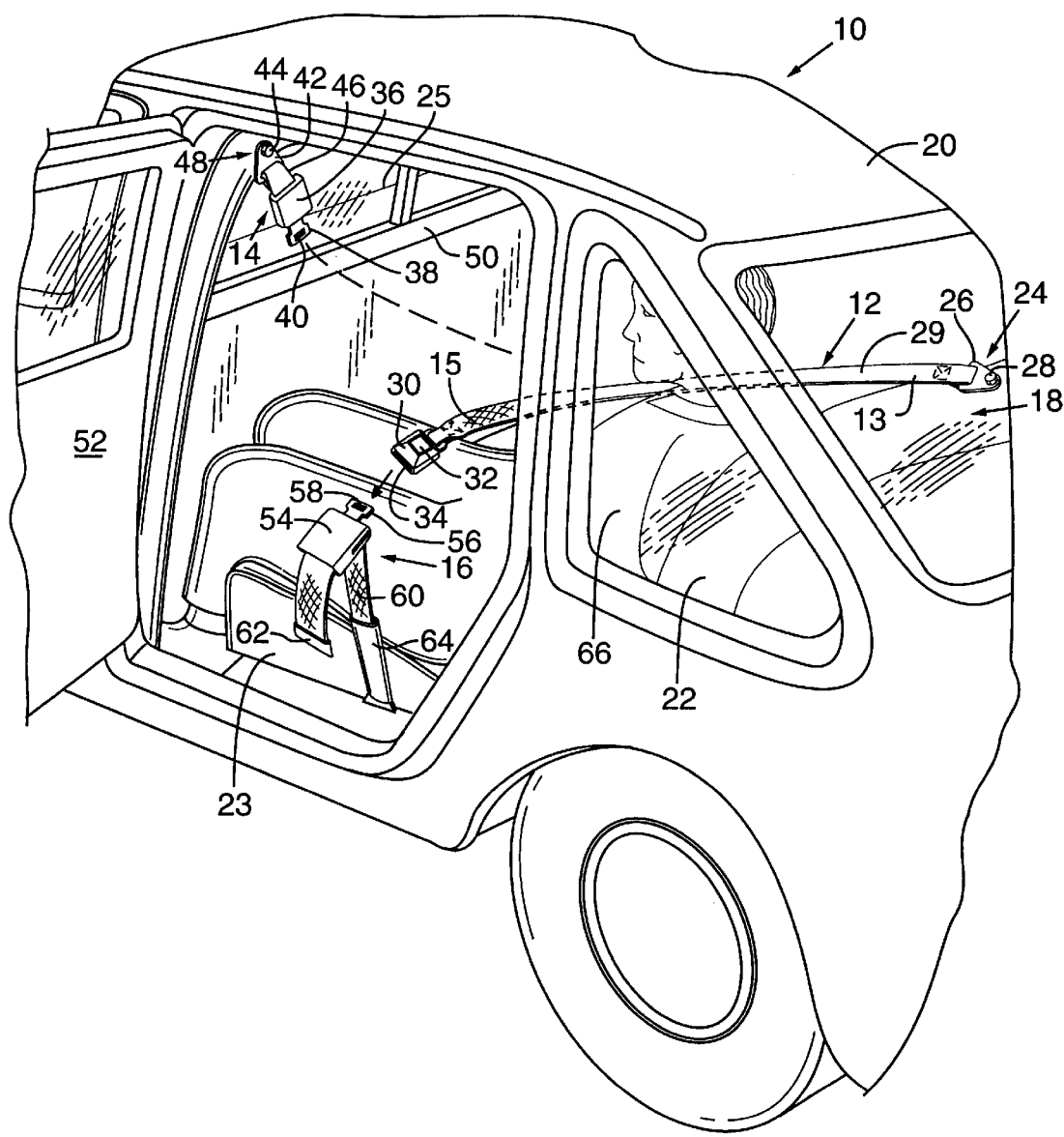
FIG. 2 is a side view of the police vehicle showing the transition between non-securing and securing operation of the system.
Figure 3:
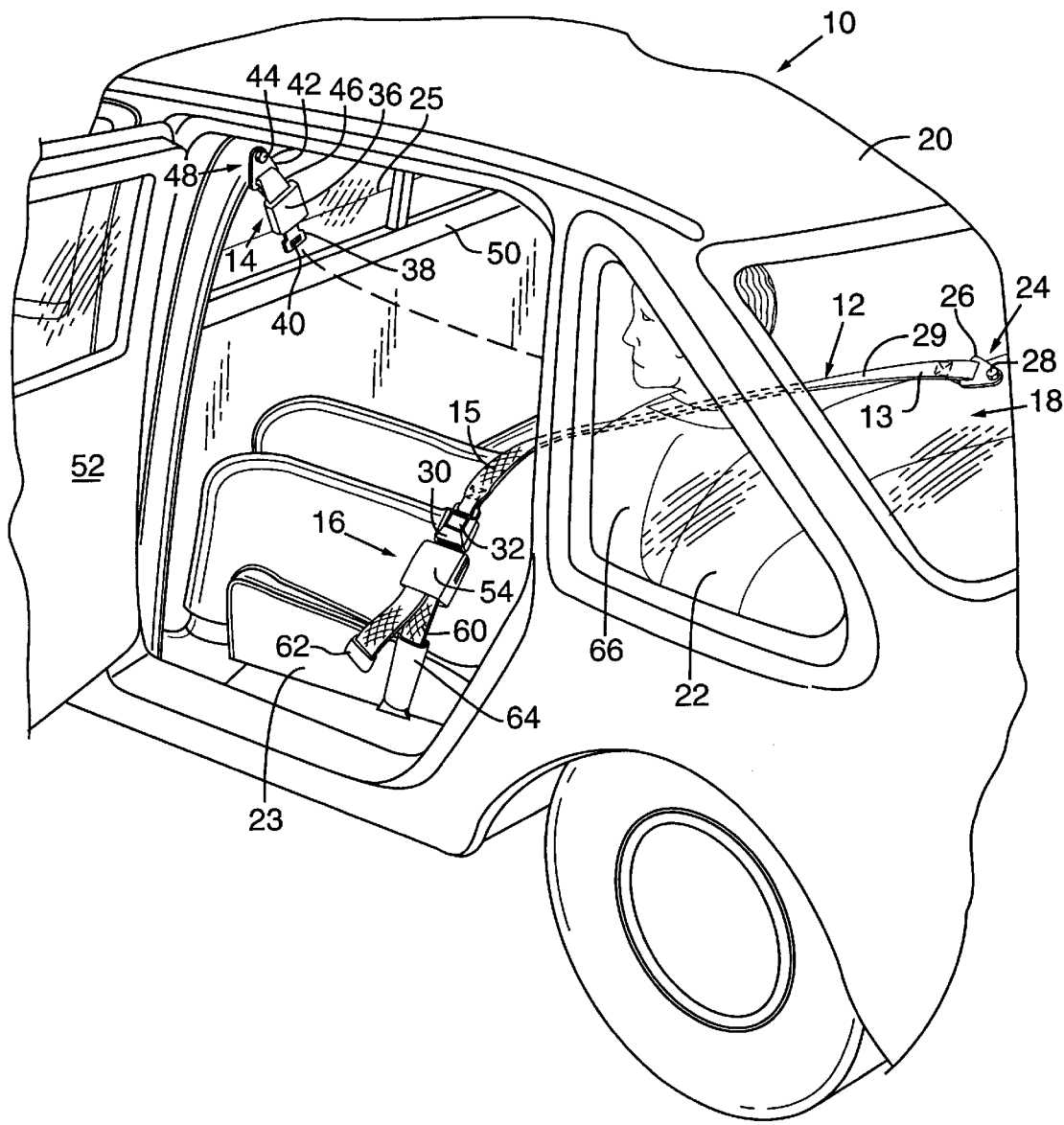
FIG. 3 is a side view of the police vehicle utilizing the present invention in a securing mode.

As seen in FIGS. 1, 2 and 3, a restraining belt system is shown generally at 10. For purposes of clarity, the system can be thought of as having three primary components: a restraining belt shown generally at 12, a mounting or stowing mechanism shown generally at 14 and a latching mechanism shown generally at 16. In accordance with the preferred embodiment, a seat 18 is shown as the rear seat of a police vehicle 20, although in alternate embodiments the seat may be a middle or front seat in a van or bus. The seat includes upright back support portion 22 and horizontal leg support portion 23. Seat 18 is disposed behind a front seat 25.

The restraining belt 12 extends outward from an anchoring point shown generally at 24, located approximately at the transverse middle of the vehicle 20, or more specifically in the middle of the top of the upright back support portion 22. This makes the restraining belt system 10 function as a shoulder belt; however, in alternative embodiments the anchoring point may be at the bottom of the middle region of the upright back support portion 22, causing the system to function as a lap belt. At the anchoring point 24, the restraining belt 12 is anchored by any suitable means, such as the swivel-mount 26 and post 28 shown. The restraining belt 12 includes flat webbing portion 29 constructed of conventional seat belt material to provide strength and durability, in an appropriate length to easily reach to the stowing mechanism 14. If the restraining belt 12 is thought of as having a first end 13 and second end 15, where the first end is connected to the anchoring point, then it is the second end upon which is mounted a first latching component such as a selectively engageable restraining buckle component 30. The restraining buckle component 30 has a conventional spring-resistance disengagement control button 32 and slot receptacle 34. The location of both the restraining buckle component 30 and the swivel-mount is fixed relative to the webbing portion of the restraining belt 12.

The stowing mechanism 14 can be implemented using a wide variety of components. In the preferred embodiment, it is shown as a selectively engageable stowing buckle component 36 with a latch end 38, where the latch end has a rectangular cut-out 40 for latching purposes. However, more simple mechanisms such as a hook or VELCRO type fastener material, in combination with VELCRO type fastener material on the restraining buckle component 30, will also work. Stowing buckle component 36, like the first end 13 of the restraining belt 12, is anchored by a swivel-mount 42 and a post 44, where both the swivel mount and the stowing buckle component 36 connect to an intermediary webbing strip 46. The location of the stowing mechanism 14 is known as stowing point 48 for attachment of the restraining belt 12. The stowing point 48 is referred to herein as being outboard of the anchoring point 24. For purposes of the present invention, outboard refers to a position closer to the side of the vehicle than the anchoring point 24 is to the side of the vehicle. In the preferred embodiment, the stowing point 48 is located near the top of a dividing wall 50, alternatively called a partition, and adjacent to door 52 of the vehicle. The dividing wall 50, a common feature in police vehicles, serves to isolate the detainee from the officers or passengers in the front of the vehicle. In other embodiments, the stowing point 48 may be on the frame of the vehicle, a door, the back side of a seat (not shown) located forward of seat 18, or any other position outboard of the anchoring point and easily accessible by an officer without the officer having to reach directly across the detainee.

Located adjacent to a side region of the seat, latching mechanism 16 includes, in the preferred embodiment, a selectively engageable latching buckle component 54 with latch end 56, where the latch end 56 has a rectangular cut-out 58 for latching purposes. Latching buckle component 54 may be thought of as a second latching component. Although these components are similar to those of the stowing mechanism, and indeed the corresponding latch ends typically are identical in shape and size, latching buckle component 54 in the preferred embodiment is different from stowing buckle component 36, in that it contains an internal roller-type cinching mechanism (not shown), through which webbing strip 60 passes. The roller mechanism operates like those found in conventional seat belt buckles, such that when webbing strip end 62 is pulled outward from the latching buckle component 54, the webbing strip 60 passes through the latching buckle component 54. The webbing strip 60 will not slide back through the latching buckle component 54 in the reverse direction unless a particular motion occurs, for example tilting the latching buckle component forward to a position almost parallel to the webbing strip 60, a motion which would not occur without purposeful manual intervention. In other embodiments, webbing strip end 62 might be stowed to a molded plastic cinching handle (not shown) to ease the tightening operation.

The latching mechanism further includes rigid plastic tubular member 64 through which webbing strip 60 passes. The tubular member 64 provides access to latching buckle component 54 at a raised level relative to the floor of the vehicle. The webbing strip 60 and tubular member 64 may be anchored to the underside or side of the horizontal leg support portion 23 of the seat, or to the floor of the vehicle.

Turning now to FIG. 1, the restraining belt 12 system can be seen in non-securing or stowed operation. Non-securing operation occurs when the restraining belt 12 extends from anchoring point 24 to stowing point 48, and as shown in the preferred embodiment, restraining buckle component 30 is engaged with stowing buckle component 36. This is achieved by grasping restraining buckle component 30, aligning latch end 38 with slot receptacle 34 and inserting the latch end into the receptacle. The conventional internal mechanisms of buckle component 30 will then engage the rectangular cut-out 40 of the latch end 38, resulting in a locked engagement, alternatively called a coupling. An officer would return the system to non-securing or stowed operation as such after its use in securing operation, i.e. after a previously secured detainee has left the vehicle.

When the system is in non-securing operation, the restraining belt 12 rests in the non-functional storage or stowed position as described. This position provides two attendant advantages. First, it allows relatively unimpeded entry and exit to and from seat 18. Further, as seen in FIG. 1, the portion of webbing strip 60 not enclosed in tubular member 64 collapses down when not in use, also increasing entry and exit access. Second, the position of the belt allows an officer outside of the vehicle to access the belt without having to lean into the vehicle or reach across the detainee. As previously discussed, this reduces the vulnerability and accessibility of the officer to the detainee.

Turning now to FIG. 2, the restraining belt system 10 is seen in transition between non-securing and securing operation. After the officer (not shown) has inserted a handcuffed detainee 66 into the vehicle 20, with the detainee sitting on the seat adjacent to the door, the officer grasps restraining buckle component 30 and pushes the disengagement control button 32. This disengages restraining buckle component 30 from stowing buckle component 36, and hence the restraining belt 12 from the stowing mechanism 14. Note that the officer is able to push the disengagement control button 32 remote from the detainee. The officer, with buckle component 30 in one hand and the restraining belt 12 trailing behind, then brings the restraining belt 12 across the detainee. Next, the officer grasps latching buckle component 54 in the other hand, aligns latch end 56 with slot receptacle 34 and inserts the latch end 56 into the receptacle such that a latching engagement forms, as previously discussed. Finally, the officer grasps webbing strip end 62 and pulls outward from latching buckle component 54, effectively cinching the restraining belt 12 tight where it traverses across the detainee's torso. The system is now in securing operation as seen in FIG. 3. Note that all of the officer's maneuvers have taken place adjacent to the door and proximate to the outside of the vehicle, decreasing the officer's vulnerability to the detainee.

When the system is in a securing mode, the detainee is firmly secured to the seat. Because the detainee's freedom of movement is greatly reduced, the chance of escape or harm to others by the detainee is also reduced. Furthermore, in the event of sudden stops, hard cornering or an automobile accident, the detainee is protected from falling forwardly or laterally. This is important because the detainee's arms are generally locked in handcuffs behind the detainee's back. The detainee is protected from injury and the police department is protected from liability. The system has the additional advantages of being durable and inexpensive due to a limited number of components, particularly moving components. Additionally, it is easily retrofitted to existing police vehicles, with minimal change necessary.

While a preferred embodiment of the invention has been described herein, and preferred methods, associated therewith, it is appreciated that modifications are possible that are within the scope of the invention.

What is claimed is:

1. A restraining belt system for securing a detainee in a seat of a vehicle, the seat having a middle region and side regions, the system comprising:

a restraining belt having a first and second end, the first end being connected at an anchoring point in the middle region of the seat and the second end extending to a stowing mechanism outboard of the anchoring point;

a first latching component mounted on the second end of the restraining belt;

wherein the stowing mechanism removably mounts to the first latching component for non-securing operation of the system, such that the belt is accessible at a point remote from the detainee, the first latching component being detached from the stowing mechanism during securing operation of the system; and a second latching component adjacent to one of the side regions of the seat that removably latches to the first latching component for securing operation of the system, such that the belt traverses the detainee's torso.

2. The system of claim 1 being disposed in a police vehicle.

3. The system of claim 1, wherein the stowing mechanism is forward of the anchoring point.

4. The system of claim 1, wherein the seat is a first seat, the system further including a second seat positioned forward of the first seat, the second seat having a back side, wherein the stowing mechanism is adjacent to the back side of the second seat.

5. The system of claim 1, wherein there is a partition forward of the seat for isolating the detainee, the stowing mechanism being adjacent to the partition.

6. The system of claim 1, wherein the seat includes an upright back support portion, the anchoring point being located in the upper part of the middle region of the upright back support portion of the seat.

7. The system of claim 1, further comprising a cinching mechanism adjacent to the second latching component for cinching the belt tight across the detainee's torso.

8. The system of claim 1, wherein the first latching component comprises a selectively engageable buckle component having a disengagement control button.

9. The system of claim 8, wherein the second latching component comprises a selectively engageable latch-ended buckle component.

10. The system of claim 9, wherein the latch-ended buckle component is a first latch-ended buckle component, the stowing mechanism comprising a second latch-ended buckle component.

11. The system of claim 1, wherein the stowing mechanism is disposed above and forward of the second latching component.

12. The system of claim 1, wherein the vehicle includes a door adjacent the seat, and wherein the stowing mechanism is attached to the vehicle at a place other than on the door.

* * * * *